(12) United States Patent
Kwon et al.

(10) Patent No.: US 6,188,704 B1
(45) Date of Patent: Feb. 13, 2001

(54) DIODE-PUMPED LASER DRIVE

(75) Inventors: Young Key Kwon; Jeffrey Michael Buske, both of Lafayette; Sergey Sobolev, Aurora, all of CO (US); Aram Semerjyan, Yerevan (AM)

(73) Assignee: Rocky Mountain Instrument Co., Longmont, CO (US)

( * ) Notice: Under 35 U.S.C. 154(b), the term of this patent shall be extended for 0 days.

(21) Appl. No.: 09/013,344

(22) Filed: Jan. 26, 1998

(51) Int. Cl.[7] ............................................. H01S 3/11
(52) U.S. Cl. ............................. 372/25; 372/10; 372/30
(58) Field of Search ............................. 372/10–17, 25, 372/30

(56) References Cited

U.S. PATENT DOCUMENTS

| 4,675,872 | 6/1987 | Popek et al. | 372/10 |
|---|---|---|---|
| 5,016,251 | 5/1991 | D'Arcy | 372/10 |
| 5,018,152 | 5/1991 | Linne et al. | 372/25 |
| 5,226,051 | 7/1993 | Chan et al. | 372/30 |
| 5,343,483 | * 8/1994 | Farrell et al. | 372/10 |

* cited by examiner

*Primary Examiner*—John D. Lee
(74) *Attorney, Agent, or Firm*—Rick Martin; Patent Law Offices of Rick Martin, P.C.

(57) ABSTRACT

This invention relates to a new diode pumped solid state laser which has a miniature Q-switching device in the cavity. Nd:YAG, Nd:YLF or Nd:YVO4 are useful solid state laser materials for Q-switching. A compact thermo-electric (TE) cooled diode laser unit is used as a pump source, and high-speed switching of the drive current driver is provided for the precise pump energy control. By using the variable high-speed switching pump source, the energy of each Q-switched output pulse from the laser can be controlled precisely and the usual "giant pulse" from the Q-switch can be eliminated. Also, the pulse energy can be controlled precisely independent of the repetition rate or switching speed of the Q-switch without using other feedback components. The Q-switch is synchronized to open at the end of each diode pump pulse.

13 Claims, 9 Drawing Sheets

DIODE-PUMPED LASER DRIVE

FIELD OF INVENTION

The present invention relates to controlling a diode current driver and a Q-switch synchronously in order to eliminate a giant first pulse and maintain a controllable, constant energy laser output.

BACKGROUND OF THE INVENTION

The principle of laser operation is stimulated emission of energy. When an electron is in an upper (i.e., excited) energy level of the laser material and a lightwave of precisely the wavelength corresponding to the energy level difference between the unexcited and excited states strikes the electron, the light stimulates the electron to move down to the lower level and emit a photon. This photon is emitted in precisely the same direction and phase with that of the incident photon. Thus, a light wave is established in the laser material, and if it can be made to travel back and forth through the laser material (also known as the gain media) it will retain its frequency and grow in amplitude as it stimulates photon emissions. This positive feedback mechanism is accomplished by a mirror placed at each end of the lasing material to reflect the traveling wave back through the laser material The rear mirror is fully reflecting, and the front mirror is partially reflecting and partially transmitting at the laser wavelength. Light reflected back and forth from the front and rear mirrors serves as positive feedback to sustain oscillation, and the light transmitted through the front mirror is the laser output light. The two mirrors are parallel and form an optical cavity that can be tuned by varying the spacing between them. The laser can operate only at those wavelengths for which a standing-wave pattern can be set up in the cavity, i.e., for which the length of the cavity is an integral number of half wavelengths.

At room temperature, the electron ground state is almost entirely occupied, and the upper energy levels are essentially unoccupied. When the upper energy level has a greater electron population than the lower level, a population inversion exists. This inverted population can support lasing since a traveling wave of the proper frequency stimulates downward transitions of the electrons with the associated energy release. The process of exciting the laser material to raise the electrons to an excited state, i.e., producing a population inversion, is referred to as pumping. Pumping can be accomplished optically with a flash lamp driven at a high frequency, by an electric discharge, by a chemical reaction, or in the case of a semiconductor laser, by injecting electrons into the upper energy level with an electric current. When a sufficient number of electrons are in an excited state, the laser energy can be released by allowing the traveling wave to exit the laser cavity.

In a typical YAG laser, the laser material comprises yttrium, aluminum, and garnet surrounded by a helical flash lamp. The front and rear mirrors are spaced apart from the laser material on the same longitudinal axis. The flash lamp is driven on and off to excite the electrons in the laser material, moving them to a higher energy level. The typical output of an optical laser consists of a series of spikes occurring during the time the laser is pumped. Spikes are created because the inverted population is being alternatively built up and depleted.

Q-switching (Q-spoiling) is a laser control technique for obtaining all the energy in a single spike of very high peak power or spreading the energy over a series of laser output pulses. As an example of the former, a typical laser generates approximately 100 mJ over an interval of 100 microseconds for an average peak power of 1000 W. The same laser can be Q-switched to emit 80 mJ in a single 10 nanosecond pulse for peak power of 8 MW. Prior art Q-switching is accomplished by alternately completely inhibiting and allowing a laser output signal. As a simple example, the Q-switch could be a mechanical shutter between the laser material and the front mirror. While the shutter is open, a laser output signal is produced. While the shutter is closed, the pumping process continues, but no laser light is emitted from the front mirror. When the shutter is closed for a relatively long time and then opened, a giant laser pulse is emitted. Further opening and closing of the shutter then produces a series of lower-power (relative to the first pulse) laser output pulses. The shutter can be driven by light-request pulses, wherein each light-request pulse opens the shutter allowing laser light to escape, but the shutter has obvious speed/frequency limitations due to its mechanical nature. As the laser pumping frequency increases, the amount of energy in the first pulse also increases relative to the steady-state laser pulse energy.

A high-peak-power pulse from a Q-switched laser is useful in optical ranging and communications and in producing nonlinear effects in materials. The series of output pulses from a Q-switched laser are useful in material heating and material removal, i.e., material scribing where a first material is deposited over a second material and each laser pulse etches away a small portion of the first material (scribes it) to produce a predetermined pattern on the second material.

One popular type of Q-switch is an acousto-optic version. In this version, a transducer constructed of lithium niobate is mounted on acousto-optic material. The transducer is driven by an RF signal that creates a grating pattern in the acousto-optic material. Laser light also impinges on the acousto-optic material such that it is perpendicular to the direction of the acoustic wave (created by the RF signal) through the acoustic-optic material. The spacing of the grating pattern depends on the frequency of the RF signal, and when the spacing reaches a certain minimum, the laser light will be deflected by the grating pattern and not passed through the acousto-optic material. Thus, there is a certain minimum RF frequency that must be used to cut-off or spoil the laser output signal. Pulses, typically referred to as light-request pulses, are provided as an input to a driver stage that controls the acousto-optic Q-switch. The pulses modulate an internally generated RF signal. During each request pulse the RF signal goes to zero; thus, the grating pattern disappears and an output signal is emitted by the laser. Between light-request pulses, when the modulated RF signal attains its normal peak-to-peak amplitude, the Q-switch is activated and there is no output signal from the laser.

In prior art acousto-optic Q-switches the driver stage responds to the request pulses by bringing the RF signal to zero during each request pulse and allowing the RF signal to attain its normal peak-to-peak amplitude between request pulses. As discussed above, this on/off control scheme creates a giant first laser output pulse when the laser has not produced an output signal for a relatively long time. This "off" time is relative with respect to the frequency of laser operation. When the Q-switched laser is to be used in its pulsed mode (where each pulse does some useful work, for instance in material scribing or heating as discussed above) the giant first pulse must be prevented from reaching the working material to avoid damaging it. Further, increasing the laser frequency to increase the efficiency of the operation is counterproductive because as the laser frequency increases the ratio of first pulse energy compared to the steady-state energy also increases. As the frequency increases and additional energy is contained in the first pulse, there may also be insufficient energy in the succeeding pulses to perform useful work. (Laser frequency is increased by increasing the amount of energy that is input to the laser to create the population inversion.)

Other types of Q-switches are well known in the art including an electro-optic Q-switch, a magneto-optic Q-switch, and a saturable organic-dye absorber Q-switch. The disadvantages associated with the production of a giant first pulse are associated with each of these Q-switch types.

Thus, it would be advantageous to limit the energy contained in the first laser pulse so that it is approximately the same as the energy in succeeding laser pulses. Accomplishing this objective also allows laser operation at a higher frequency to provide more efficient use of the laser in material heating, material scribing, or any of the other uses associated with a pulsed laser.

U.S. Pat. No. 4,675,872 (1987) to Popek et al. discloses a pumped laser system having a Q-switch which controls the laser output. In order to eliminate the giant pulse from the Q-switch output, adjustable Q-switch spoiling is provided at the beginning of each sequence of output pulses.

U.S. Pat. No. 5,226,051 (1993) to Chan et al. discloses a method and apparatus to control the power delivered to the laser pump in order to limit the maximum energy of any single laser pulse output as a result of Q-switching. The laser pump is driven at full strength for a selected initial refresh time and then shut off. If a Q-switch trigger signal is received during the shut-off period, then only the reduced energy stored in the laser is released. An algorithm reduces the power to a lower level sufficient to maintain the net energy stored in the laser at a predetermined value if the elapsed time reaches or exceeds the refresh time. This is the closest known prior art. The system cannot be used for widely varying time intervals between the pulses. The system cannot control the energy of each pulse; rather, it can only limit the maximum energy of each pulse.

U.S. Pat. No. 5,016,251 (1991) to D'Arcy discloses a Q-switch driver for controlling the laser output in a long-pulse mode only. A means to calculate a timing window for triggering the Q-switch is provided, wherein the Q-switch remains open during the window period. The device is limited to a narrow range of beam intensities and not appropriate for general purposes.

U.S. Pat. No. 5,018,152 (1991) to Linne et al. discloses a Q-switched laser having a detector to sense the population inversion using the fluorescence signal and then via a feedback loop to generate the energy control signal. As the switching rate of the Q-switch is varied, the energy control signal via the feedback signal is varied to ensure a constant level of population inversion between each pulse. The device attempts to provide a pre-specified pulse energy for each pulse independent of the switching rate of the Q-switch. Drawbacks to this approach include the requirement for extra devices and circuits to measure the energy and produce the feedback signal. Also, calibration problems add costs to the mass production of such devices.

All of the above approaches allow the gain media to be excited to a rather uncontrollable state and then to attempt to release small controllable bursts of energy. Only Chan attempts to control and maintain the gain media in an energy state which is useful for producing a steady energy level output.

The present invention recognizes that known gain media materials including Nd:YAG, Nd:YLF, Nd:YVO4 have corresponding fluorescent lifetimes. These lifetimes are respectively 230 microseconds, 480 microseconds, and 90 microseconds. The present invention models the diode current driver to pulse the gain media with a pulse width as short as 20% of the fluorescent lifetime. The result is controlling the gain media in a useful range of excitation at all times. In order to provide a steady energy laser output, the Q-switch is synchronized to open at the end of each drive pulse to the diode current driver.

SUMMARY OF THE INVENTION

The main aspect of the present invention is to provide a steady energy laser output by modulating the output of the diode current driver and synchronously opening the Q-switch at the end of each drive pulse to the diode current driver.

Another aspect of the present invention is to maintain the gain media at a useful energy level by providing a pulse width to the diode pump as short as 20% of the fluorescent lifetime of the gain media such as a minimum pulse width of 20 microseconds to be used with Nd:YVO4 which has a fluorescent lifetime of 90 microseconds.

Another aspect of the present invention is to utilize either an internal variable pulse generator or any external incoming pulse to turn on the diode laser driver.

Another aspect of the present invention is to control the laser pulse energy precisely and independent of the repetition rate or switching speed of the Q-switch without using a feedback loop.

Another aspect of the present invention is to provide an independent "high" and "low" controllable value for the diode current driver to execute.

Another aspect of the present invention is to set the low output of the diode current driver at a threshold for the device such as 4 to 5 amps, and then set the high value up to its maximum such as 40 amps.

Another aspect of the present invention is to control the pump pulses to short intervals of 10 microseconds or less.

Other aspects of this invention will appear from the following description and appended claims, reference being made to the accompanying drawings forming a part of this specification wherein like reference characters designate corresponding parts in the several views.

The preferred embodiment uses a Nd:YVO4 gain media and a high power diode current driver capable of delivering 100 watts of power maximum. A digital to analog board provides a separate high and low power output drive pulse to the diode current driver with a maximum 10 volts compliance voltage. A pulse forming board is built into the diode laser controller which is commercially produced by Rocky Mountain Instrument Company, (RMI) Longmont, Colo., and trademarked the "IQ-4000". The pulse-forming board also includes an external pulse input and a pulse source select switch. An outside computer (PC) supplies the Q-switch gate signal synchronously at the end of each drive pulse to the diode current driver. Software onboard the PC times the Q-switch gate signal at the end of each drive pulse. With the above system an Nd:YVO4 laser is controlled with no giant first pulses to these specifications:

| | |
|---|---|
| Diode laser power | 20W CW |
| Drive current - peak value | 20A |
| Drive current - rise time | 10 microseconds |
| Drive current - fall time | 10 microseconds |
| Laser material | Nd:YVO4 |
| Q-switched output-peak | 20 kW peak, 0, 3 mJ/pulse @ 1 kHz rep. Rate |
| Controllable pulse energy | 0.05 mJ/pulse to 0.3 mJ pulse |

Before explaining the disclosed embodiment of the present invention in detail, it is to be understood that the invention is not limited in its application to the details of the particular arrangement shown, since the invention is capable of other embodiments. Also, the terminology used herein is for the purpose of description and not of limitation.

DESCRIPTION OF THE PREFERRED EMBODIMENT

Figure 1:
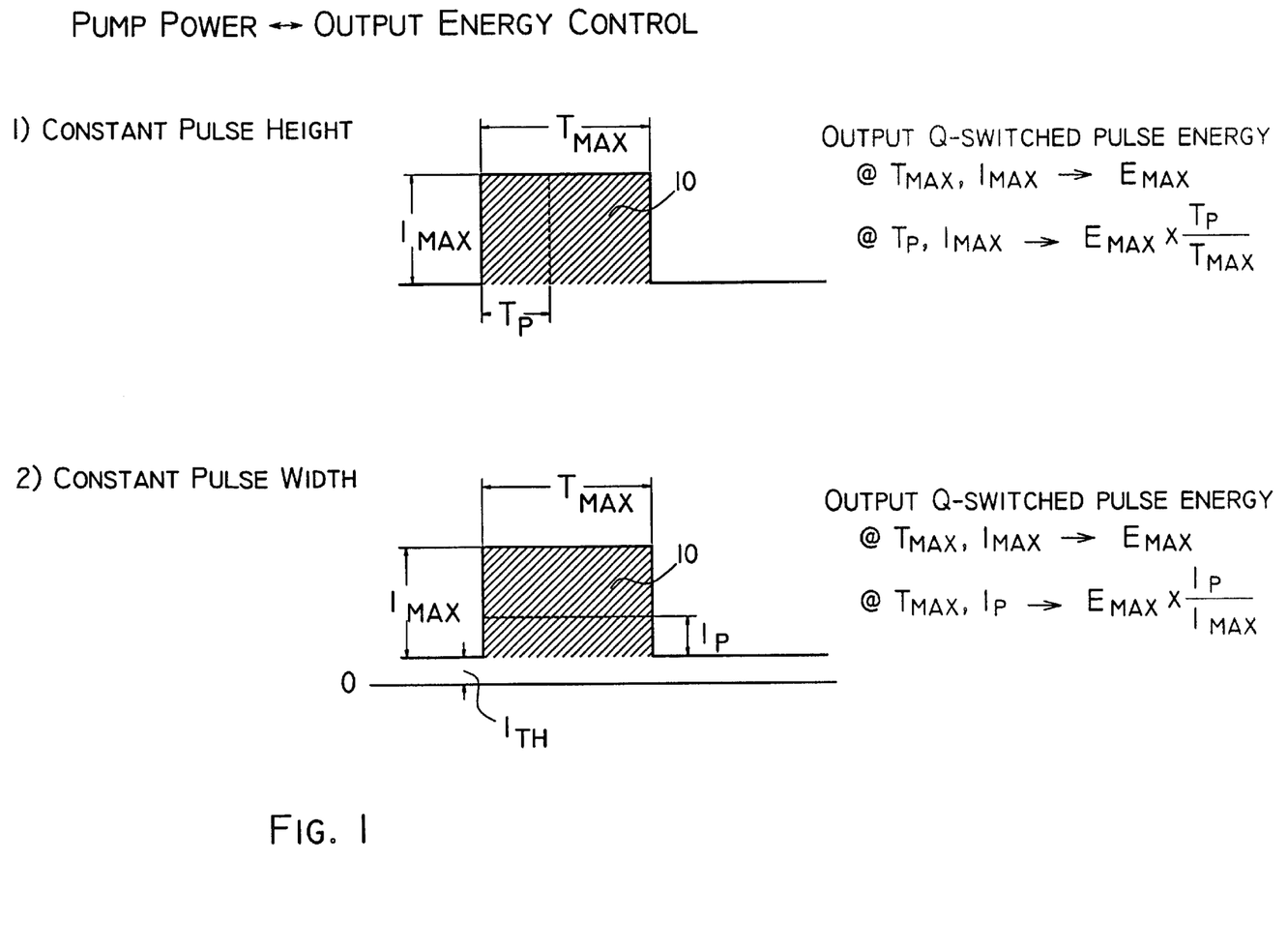
FIG. 1 is a graph showing the theory of operation for controlling the gain media at a constant usable energy level.

Referring first to FIG. 1 the graph 1 entitled "constant pulse height" shows the theoretical approach to varying the diode pump output pulse width $T_p$ in order to control the energy in the gain media indicated at its maximum to be area 10. Area 10 represents for a particular gain media such as Nd:YVO4 the maximum energy achievable by a single power pulse from the diode pump. The present invention can produce the maximum diode pump current output I max. In order to control the laser power output, the pulse width of the diode pump output is varied to a desired width $T_p$. The present invention supplies electronic circuitry to produce a value of $T_p$ in the range of 20 microseconds or larger. The area 10 equals the maximum energy $E_{max}$, wherein; $E_{max}= (T_{max})(I_{max})$. Therefore, a setpoint energy $E_{sp}$ is calculated as $$E_{sp} = (E_{max})\left(\frac{T_p}{T_{max}}\right).$$

For practical circuit design considerations, it is preferable to provide in the diode current driver a pulse width of no more than 20% of the fluorescent lifetime of the gain media. For a Nd:YVO4 laser having a fluorescent lifetime of 90 microseconds this equates to a pulse width of 20 microseconds or less. The present invention achieves a minimum 20 microseconds pulse width.

Referring to FIG. 1 graph 2 entitled "constant pulse width" the area 10 is the same. The method to control the maximum per pulse laser energy 10 now holds the pulse width constant at $T_{max}$. The current output from the diode pump is held at least to a threshold value for the diode pump of $I_{th}$. The desired setpoint energy is computed as $$E_{sp} = (E_{max})\left(\frac{I_p}{I_{max}}\right).$$

In each of the above methods of energy control, the Q-switch is synchronously tied to open at the end of each diode pump pulse.

Figure 2:
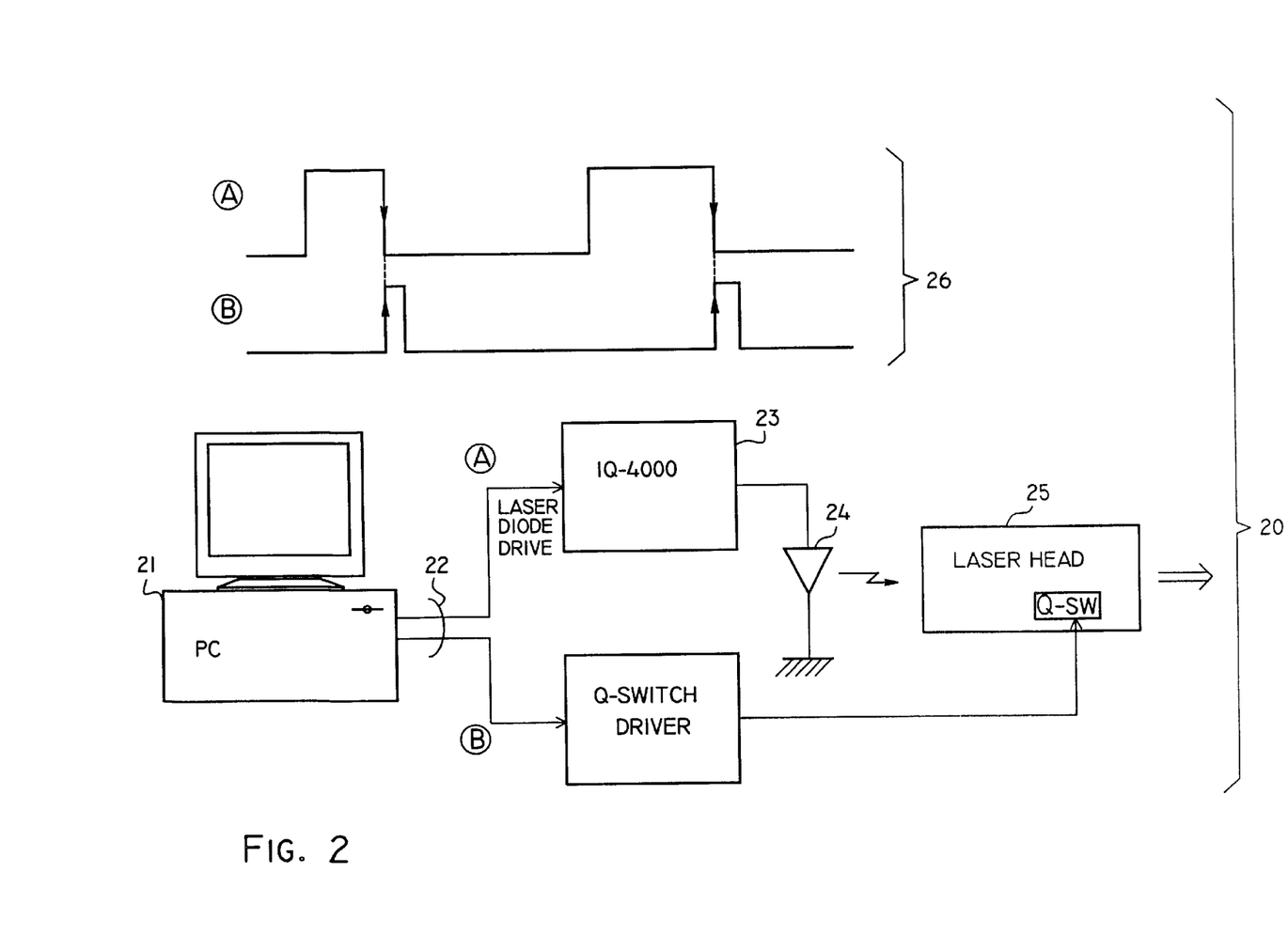
FIG. 2 is a schematic diagram of the laser system in its commercially available preferred embodiment.

Referring next to FIG. 2 the laser system 20 is the preferred embodiment. The laser system 20 has a PC 21 which contains a synch card 26 for controlling the triggering of the Q-switch after each diode pump pulse. The Cyber Research of Branford, Conn., Model CYPDMA32 digital I/O board is used herein in a Microsoft Windows® environment. The Pc input/output connections 22 connect to the diode laser controller 23 (commercially trademarked as the IQ-4000). The diode laser controller 23 powers the diode 24 which pumps the laser 25.

Figure 3:
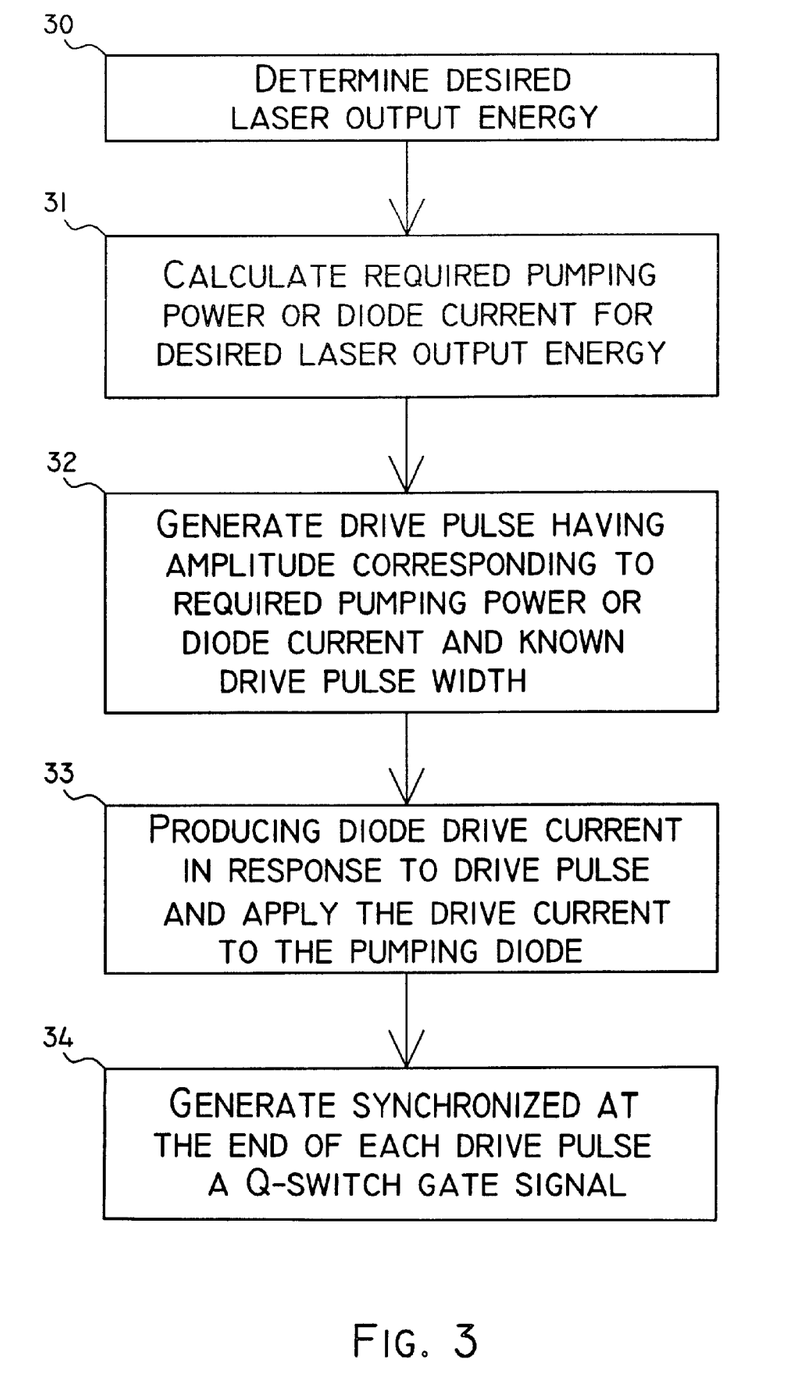
FIG. 3 is a logic flow chart of the inventive method disclosed herein.

Referring next to FIG. 3 the inventive method comprises:
 (30) Determining a desired laser output energy;
 (31) Calculating a required diode pumping power from a pumping diode to produce the desired laser output;
 (32) Generating a drive pulse (FIG. 5, graph A) required to produce the required diode pumping power;
 (33) Producing a required diode pumping power as a diode drive current (FIG. 5, graph B) and applying said diode drive current to the pumping diode; and
 (34) Generating a synchronized Q-switch gate signal (FIG. 5, graph C) at an end of each drive pulse.

It is noted that the timing between the end of drive pulse A and the start of Q-switch gate signal C can be a few hundred nanoseconds either way because of the delay of the laser output pulse (FIG. 5, graph D) after the start of gate signal C. Steps 32, 33, 34 above are herein characterized as a "logic module".

Figure 4:
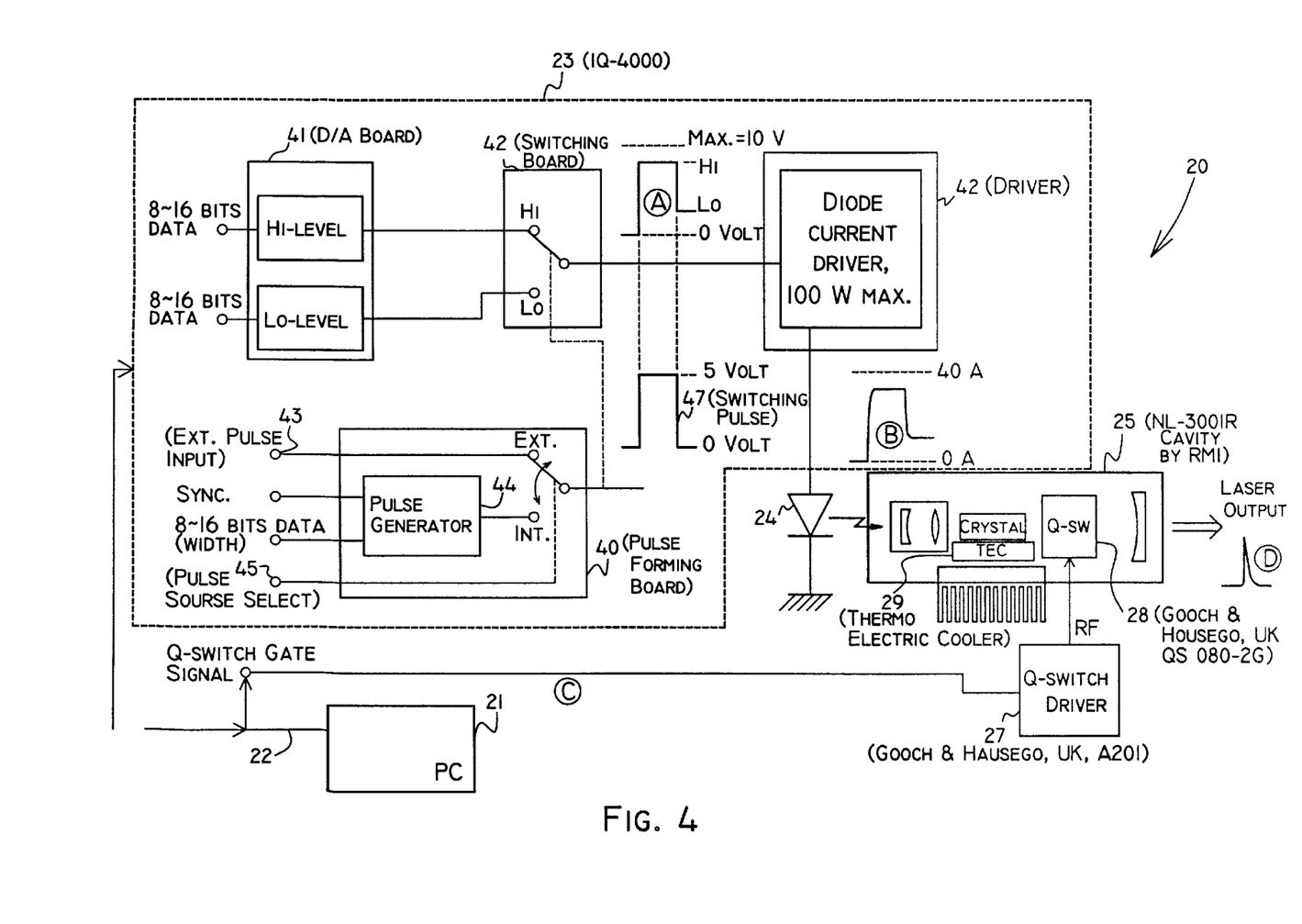
FIG. 4 is a schematic of the system components shown in FIG. 2.
Figure 5:
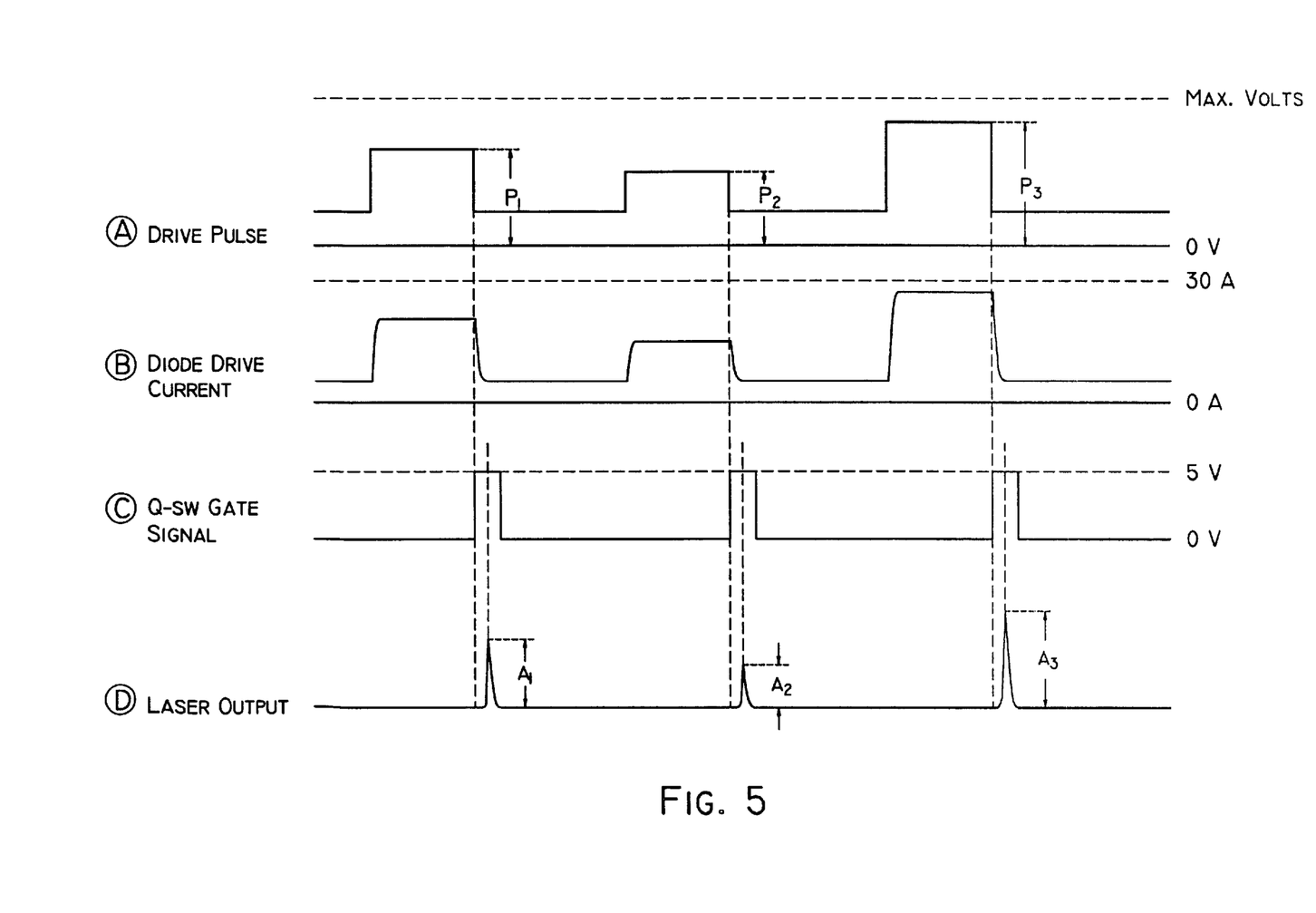
FIG. 5 is a timing chart showing the operation of the inventive method.

Referring next to FIG. 4 the laser system 20 comprises the laser 25 which as a Q-switch 28 and a Q-switch driver 27. The thermo-electric cooling unit 29 cools the laser 25. In the preferred embodiment, the Q-switch driver is a model A201 manufactured by Gouch & Housego Ltd., England, and the Q-switch is a Gouch Model QS 080-2G. The laser is a Rocky Mountain Instrument Company (RMI), Longmont, Colo., Model No. NL-300 IR. The diode laser controller 23 is RMI's Model No. IQ-4000. The diode laser controller 23 has a D/A board 41 which provides the desired low and high level control signals to the switching board 42. The pulse-forming board 40 offers the user a choice of selecting either an external pulse input 43 or the internal pulse generator input 44 via the pulse source select switch 45. Alternatively, the user may select the computer 21 pulse generator (not shown). The desired switching pulse 47 controls the drive pulse A (FIG. 5). The diode current driver 46 has a 400 watt power maximum at 10 volts/40 amps.

The diode drive current B (FIG. 5) drives the diode 24 which pumps the laser 25. The Q-switch gate signal C is controlled by the computer 21 to result in the laser output D (FIG. 5).

Referring net to FIG. 5, it can be seen that each laser output pulse amplitude $a_1$, $a_2$, $a_3$ corresponds to its parent drive pulse amplitude $p_1$, $p_2$, $p_3$.

Especially for the laser material processing or medical laser applications, it is very important to control the pulse energy coming out from the Q-switched laser. If we use a flash lamp as a pumping source for the solid-state laser, it is known we cannot decrease the rise time of the flash lamp current below some value (approximately 100 microseconds) to prevent the acceleration of electrode erosion and wall vaporization which affect the lamp lifetime. So it is not practical to design the pump circuit for the flash lamp which can supply the pump pulse width below 200 microseconds for the laser of average output over a few watts.

The present invention aims at solving the above described problems accompanying the conventional methods, and makes it an object to provide a new compact Q-switched solid state laser which uses a compact diode laser as a pump source.

In order to accomplish the above objective, the method and apparatus described above provides a diode driver/controller with either CW or pulse pumping capability. The internal variable pulse generator or any external incoming pulse can be used to turn on the diode laser driver and can supply a predetermined current to the diode laser during the "on" time of the controlling pulse as shown in FIG. 4. The minimum width of this pulse can be five microseconds, and the maximum is not limited so that the width can be controlled linearly with high accuracy. The pump power can be controlled precisely in this way, and the Q-switch pulse can be applied at the end of the pumping pulse (FIG. 5).

The laser material can be Nd:YAG, Nd:YLF, Nd:YVO4 or other similar materials. The typical value of fluorescent lifetime of these materials are 230 microseconds, 480 microseconds' and 90 microseconds respectively. So the pump source must be able to provide pulse width of minimum 20 microseconds to be used with Nd:YVO4 since the sum of the rising and falling time should not be more than the 20% of the fluorescent lifetime to control the pump energy with practical accuracy. The laser can be powered in three different ways:

| | | |
|---|---|---|
| 1) CW | Pulse Source Select | INT |
| | Hi/Lo Gate Pulse | Hi (fixed) |
| | CW Drive Current | Set by Hi Value |
| 2) Pulse | Pulse Source Select | INT or EXT |
| | Hi/Lo Gate Select | Pulse Sig. from INT or EXT Hi/Lo Switching |
| | Pulse Drive Current Max. | Set by Hi Value |
| | Pulse Drive Current Min. | Set by Lo Value |
| 3) Waveform Generation | Pulse Source Select | INT or EXT |
| | Hi/Lo Gate Select | Pulse Sig. From INT or EXT |
| | Pulse Drive Current Max. | Set by Hi Vaiue (varying) |
| | Pulse Drive Current Min. | Set by Lo Value (varying) |

In either case the Q-switch can be operated separately. The actual energy per pulse can be set by the value of pulse width/height of the pump pulse as well as changing the CW pump level. The "Lo" value of the drive current setting provides flexibility of this driver design for the Q-switched laser since it is possible to set the "Lo" value approximately at the threshold value of the laser and to switch the current to the "Hi" value to get the laser output. This allows the exact energy control of the output laser pulse. Also a "waveform generation" feature allows more flexibility in operating the laser in the pulse mode.

Figure 6:
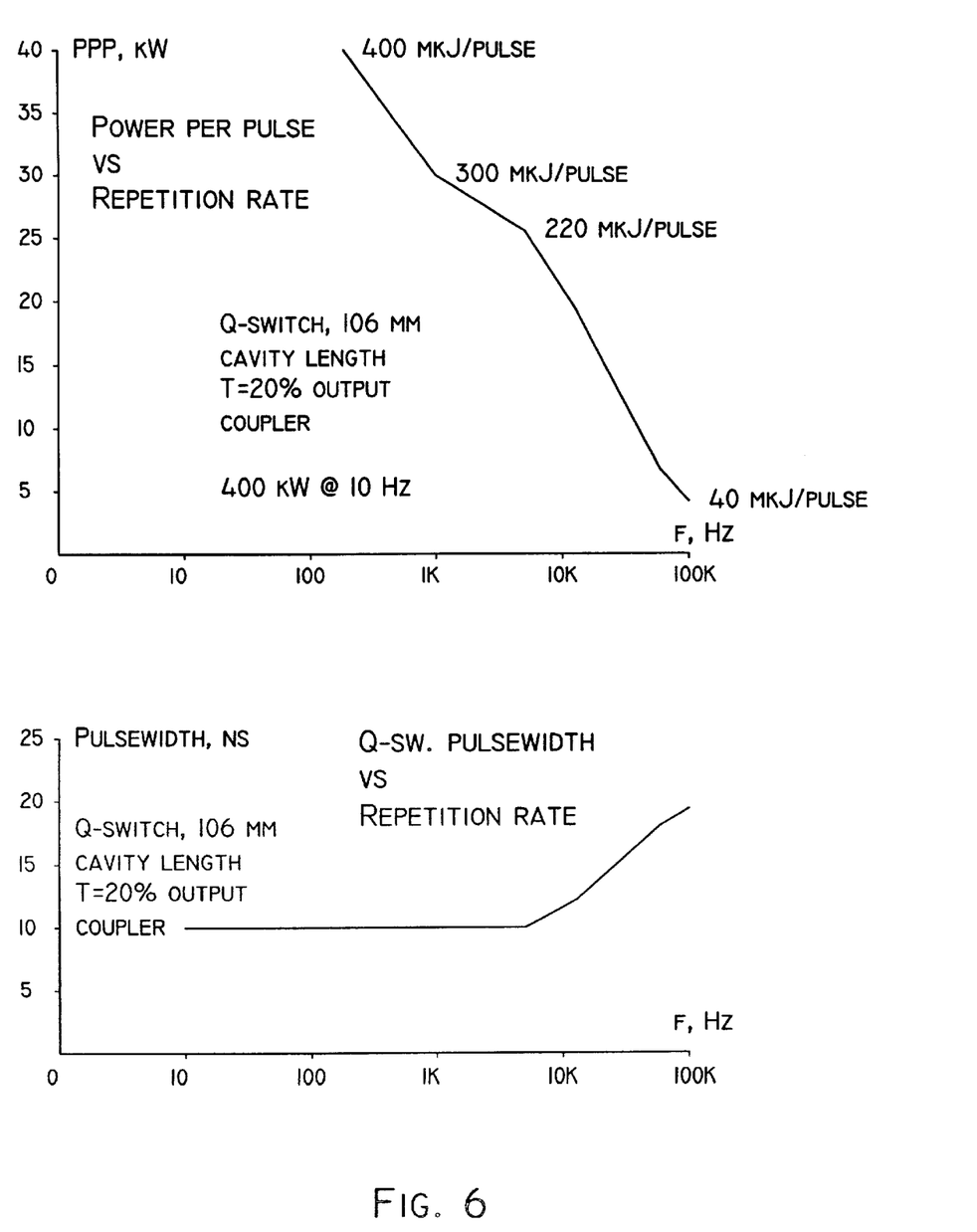
FIG. 6 is a pair of graphs showing the relationships of actual test data for the power per pulse and Q-switch pulse width.
Figure 7:
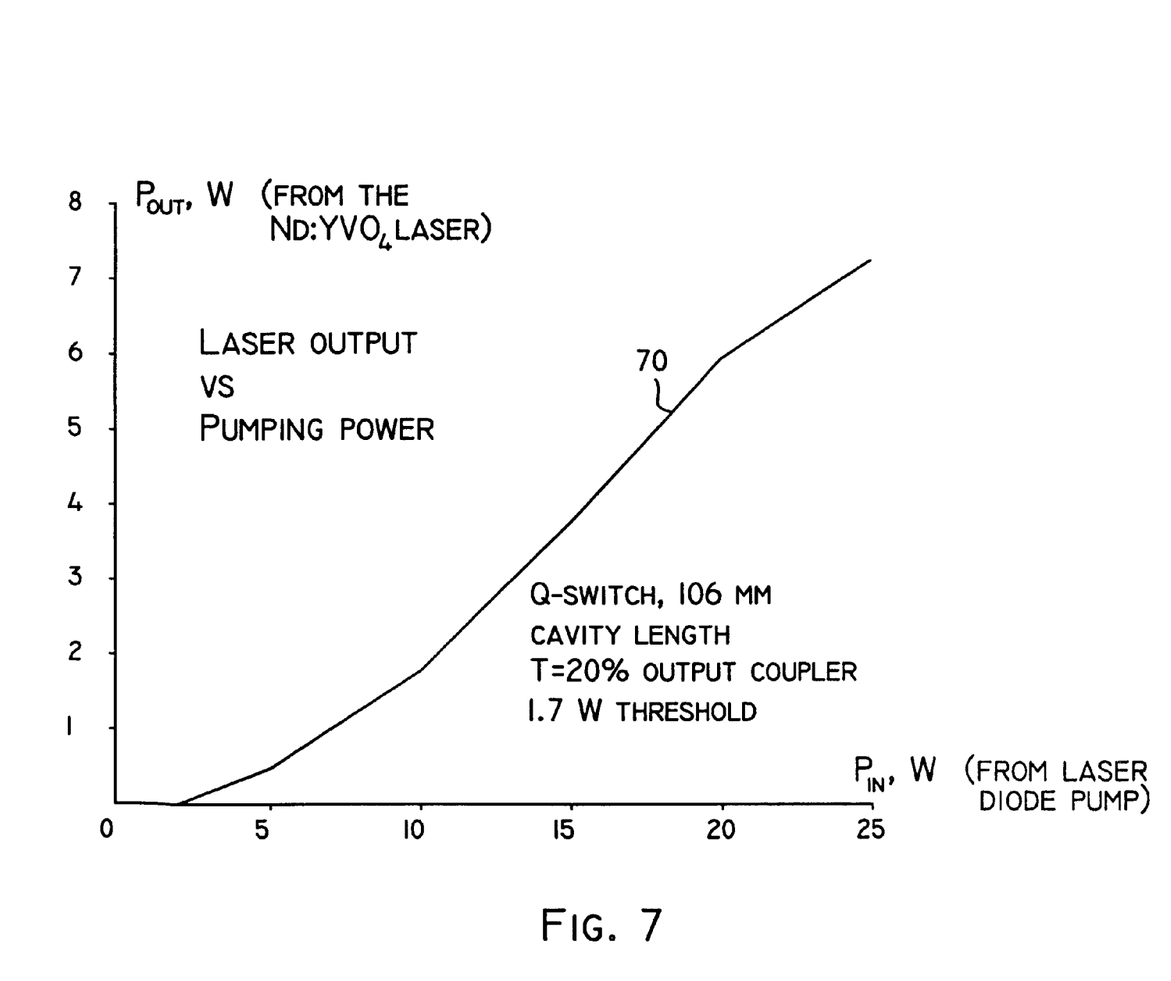
FIG. 7 is a graph of the actual test data for the Nd:YVO4 laser showing the diode output power vs. the laser output.
Figure 8:
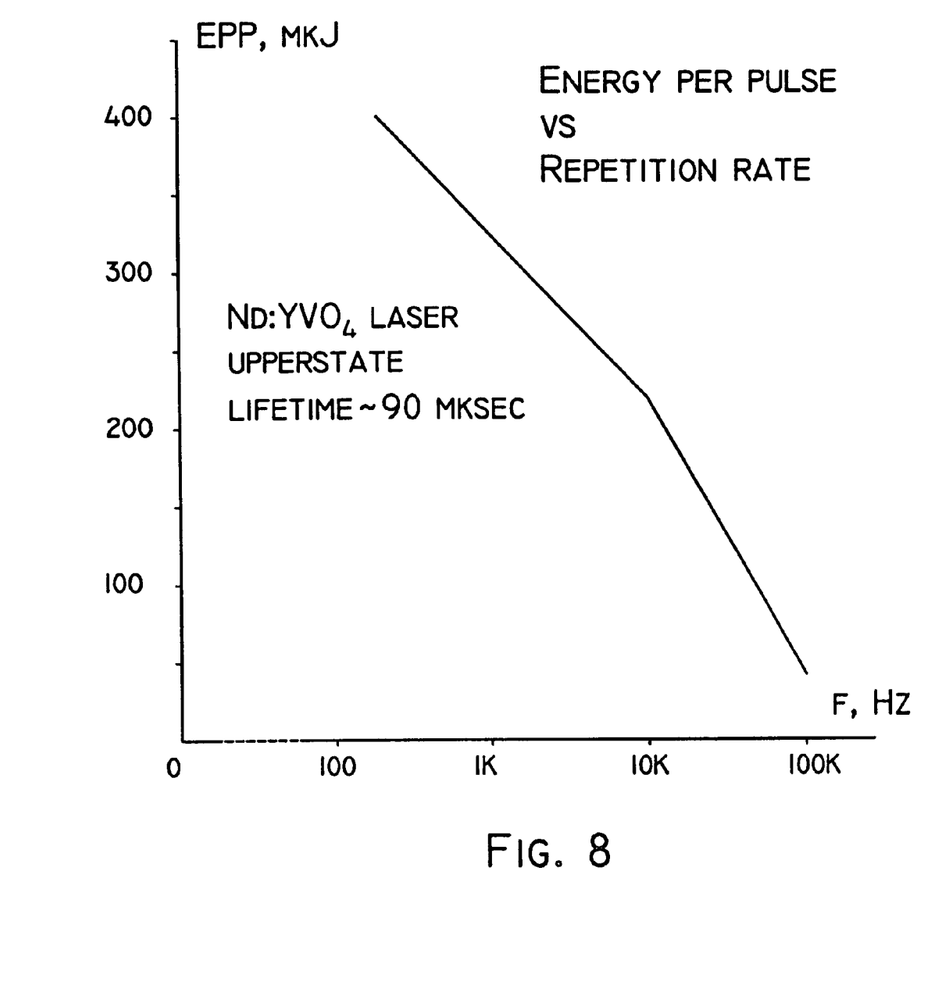
FIG. 8 is a graph showing the relationship expected from a Nd:YVO4 laser in energy per pulse vs. cycle time.

Referring next to FIGS. 6 and 7 the data represented is experimental data taken from the preferred embodiment. In FIG. 7 Laser Output vs. Pumping Power graph of actual data shows the laser output 70 to be almost linearly related to the diode pump power in. FIG. 8 shows an actual typical approximation of energy per pulse vs. frequency for a Nd:YVO4 laser.

Figure 9:
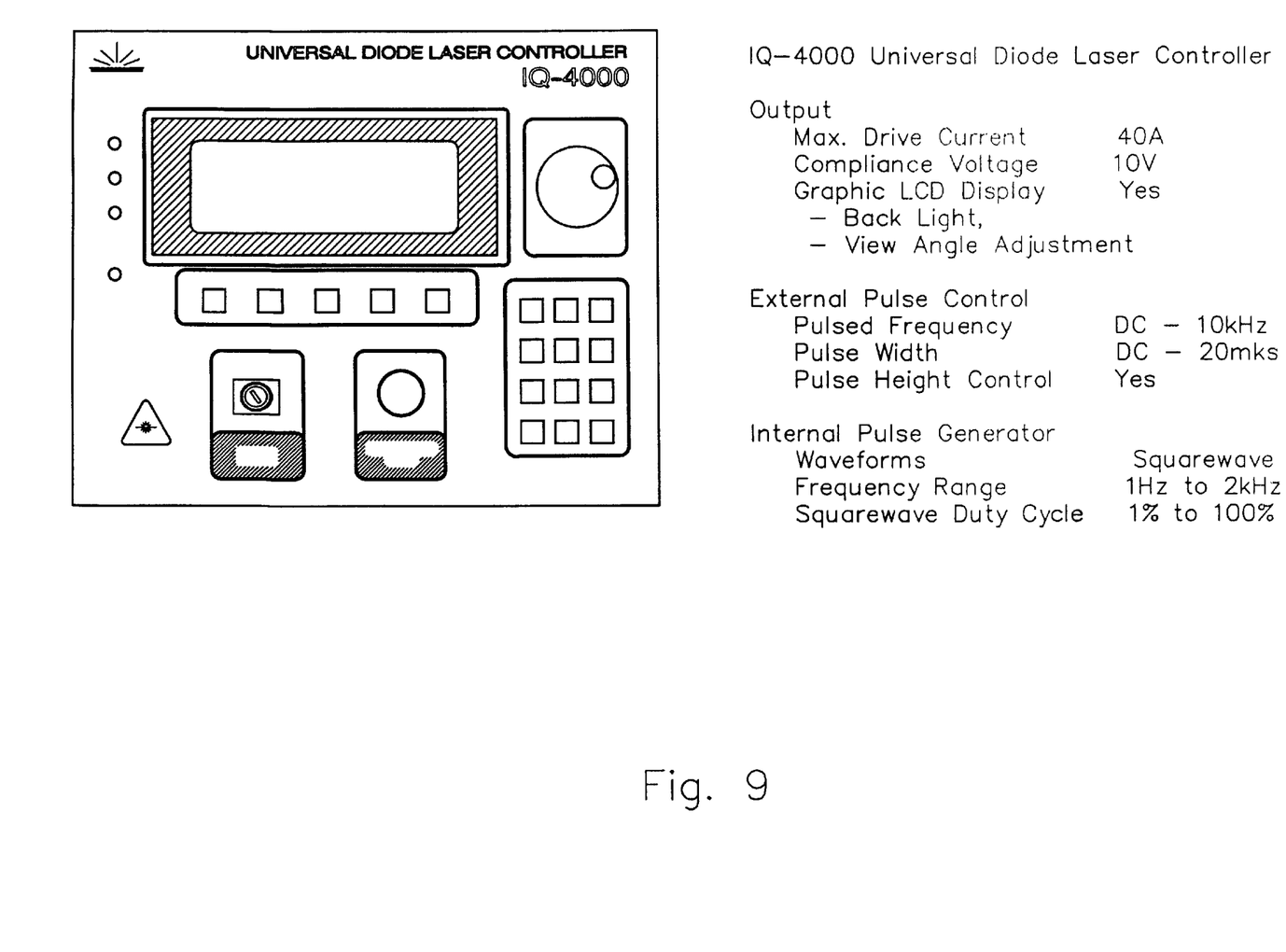
FIG. 9 is a front plan view of the IQ-4000 Universal Diode Laser Controller and specifications.

FIG. 9 is an excerpt from the specification sheet of the IQ-4000 showing the front plan view of the device.

Although the present invention has been described with reference to preferred embodiments, numerous modifications and variations can be made and still the result will come within the scope of the invention. No limitation with respect to the specific embodiments disclosed herein is intended or should be inferred.

We claim:

1. An apparatus for controlling pulse energy in a laser system including a resonant cavity, a gain medium within the cavity, a cavity switch, and a diode pump, comprising:

a diode pump current driver connected with the diode pump for controlling energy of a drive pulse delivered to the diode pump according to an energy control signal;

a processor connected with said diode pump current driver, said processor operating to trigger the cavity switch substantially in synchronism with said drive pulse; and said diode pump current driver generates a plurality of said drive pulses having one of a first and second level, said first level corresponding approximately to a threshold value of the gain medium and said second level being greater than said first level.

2. The apparatus of claim 1 wherein said drive pulse has a substantially constant amplitude and a variable pulse width.

3. The apparatus of claim 2 wherein said pulse width is in the range of 5 to 500 microseconds.

4. The apparatus of claim 1 wherein a pulse width is no more than 20% of a fluorescent lifetime of the gain medium.

5. The apparatus of claim 4 wherein said gain medium has a fluorescent lifetime of approximately 90 microseconds and said pulse width is 20 microseconds or less.

6. The apparatus of claim 5 wherein said gain medium is Nd:YVO4.

7. The apparatus of claim 1 wherein said processor operates to trigger said cavity switch within 300 nanoseconds of the end of said drive pulse.

8. The apparatus of claim 1 wherein said drive pulse has a substantially constant pulse width and a variable pulse amplitude.

9. The apparatus of claim 1 wherein said first level has a value from 4 to 5 amps and said second level has a value of approximately 40 amps.

10. The apparatus of claim 1 wherein said second level corresponds to a desired laser output energy.

11. The apparatus of claim 1 wherein the laser output energy is substantially linearly related to said energy of said drive pulse.

12. The apparatus of claim 1 further comprising a pulse generator circuit connected with said diode pump current driver.

13. The apparatus of claim 1 wherein said processor comprises a synchronization card installed in a personal computer.

* * * * *